US008474046B1

(12) United States Patent
Gong et al.

(10) Patent No.: US 8,474,046 B1
(45) Date of Patent: Jun. 25, 2013

(54) SYSTEMS AND METHODS FOR IDENTIFYING THE SPREADING OF SENSITIVE DATA BY A SUSPICIOUS APPLICATION

(75) Inventors: Sheng Gong, Beijing (CN); Zhe Liu, Beijing (CN); Xue Feng Tian, Beijing (CN)

(73) Assignee: Symantec Corporation, Mountain View, CA (US)

( * ) Notice: Subject to any disclaimer, the term of this patent is extended or adjusted under 35 U.S.C. 154(b) by 66 days.

(21) Appl. No.: 13/188,346

(22) Filed: Jul. 21, 2011

(51) Int. Cl.
*G06F 11/00* (2006.01)

(52) U.S. Cl.
USPC .................................. 726/23; 726/22; 726/24

(58) Field of Classification Search
None
See application file for complete search history.

(56) References Cited

U.S. PATENT DOCUMENTS

| 6,105,067 | A  | * | 8/2000  | Batra .......................... 709/227 |
| 6,493,719 | B1 | * | 12/2002 | Booth et al. ............. 707/999.01 |
| 7,937,714 | B2 | * | 5/2011  | Grigsby et al. ............... 719/318 |

OTHER PUBLICATIONS

Symantec Launches Norton Smartphone Security, dated 2007.*
Symantec to Support New Version of Virus Scanning API for Microsoft Exchange 2000, dated 2001.*
XADM: Understanding Virus Scanning API 2.0 in Exchange 2000 Server SP1, dated 2007.*

* cited by examiner

*Primary Examiner* — David Y Jung
(74) *Attorney, Agent, or Firm* — Holland & Hart LLP

(57) ABSTRACT

A computer-implemented method to identify the spreading of sensitive data from a suspicious application is described. At least one security attribute for an application programming interface (API) is defined. Sensitive data passed through the at least one security attribute to the suspicious application are marked. The marked sensitive data being passed through the at least one security attribute from the suspicious application are detected. A notification is generated regarding the spreading of the sensitive data by the suspicious application.

20 Claims, 6 Drawing Sheets

SYSTEMS AND METHODS FOR IDENTIFYING THE SPREADING OF SENSITIVE DATA BY A SUSPICIOUS APPLICATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

A computer system may execute various types of applications or software programs. These applications may provide certain functions and interfaces to the user of the computer system. In some cases, one application may interface with another application on the computer system. The interface that allows different applications to communicate with each other is an application programming interface (API). For example, a first application may interface with an API and the API may in turn interface with a second application. The first application may request and receive information from the second application through the API. In this manner, developers of an application may also create an API for that application. This API may be provided to developers of additional applications. As a result, the developers of the additional applications may incorporate the specifications of the API into the additional applications so that these additional applications may interface with the original application. When a user requests information from a first application that is available through a second application, the first application may communicate with the second application to request and receive the data via the API that serves as the interface between the first and second applications.

SUMMARY

According to at least one embodiment, a computer-implemented method to identify the spreading of sensitive data from a suspicious application is described. At least one security attribute for an application programming interface (API) is defined. Sensitive data passed through the at least one security attribute to the suspicious application are marked. The marked sensitive data being passed through the at least one security attribute from the suspicious application are detected. A notification is generated regarding the spreading of the sensitive data by the suspicious application.

In one embodiment, the at least one security attribute may be an incoming security attribute for incoming data passed through the API to the suspicious application. In one example, the at least one security attribute may be an outgoing security attribute for outgoing data passed from the suspicious application through the API. The suspicious application may execute on a smartphone device.

In one configuration, the sensitive data passed to and from the suspicious application through the API may be monitored in a simulated environment. At least one additional security attribute for the API may be defined. An argument passed on the at least one additional security attribute may cause at least one data object to become sensitive data. An argument passed on the at least one additional security attribute may cause at least one data object in a smartphone device to become exposed. In one embodiment, the spreading of sensitive data from a suspicious application may be identified using static analysis.

A smartphone device configured to identify spreading of sensitive data from a suspicious application is also described. The smartphone device may include a processor and memory in electronic communication with the processor. The device may further include a monitoring module configured to define at least one security attribute for an API and mark sensitive data passed through the at least one security attribute to the suspicious application. The module may be further configured to detect the marked sensitive data being passed through the at least one security attribute from the suspicious application, and generate a notification regarding the spreading of the sensitive data by the suspicious application.

A computer-program product for identifying spreading of sensitive data from a suspicious application is also described. The computer-program product may include a non-transitory computer-readable medium having instructions thereon. The instructions may include code programmed to define at least one security attribute for an API, and code programmed to mark sensitive data passed through the at least one security attribute to the suspicious application. The instructions may further include code programmed to detect the marked sensitive data being passed through the at least one security attribute from the suspicious application, and code programmed to generate a notification regarding the spreading of the sensitive data by the suspicious application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
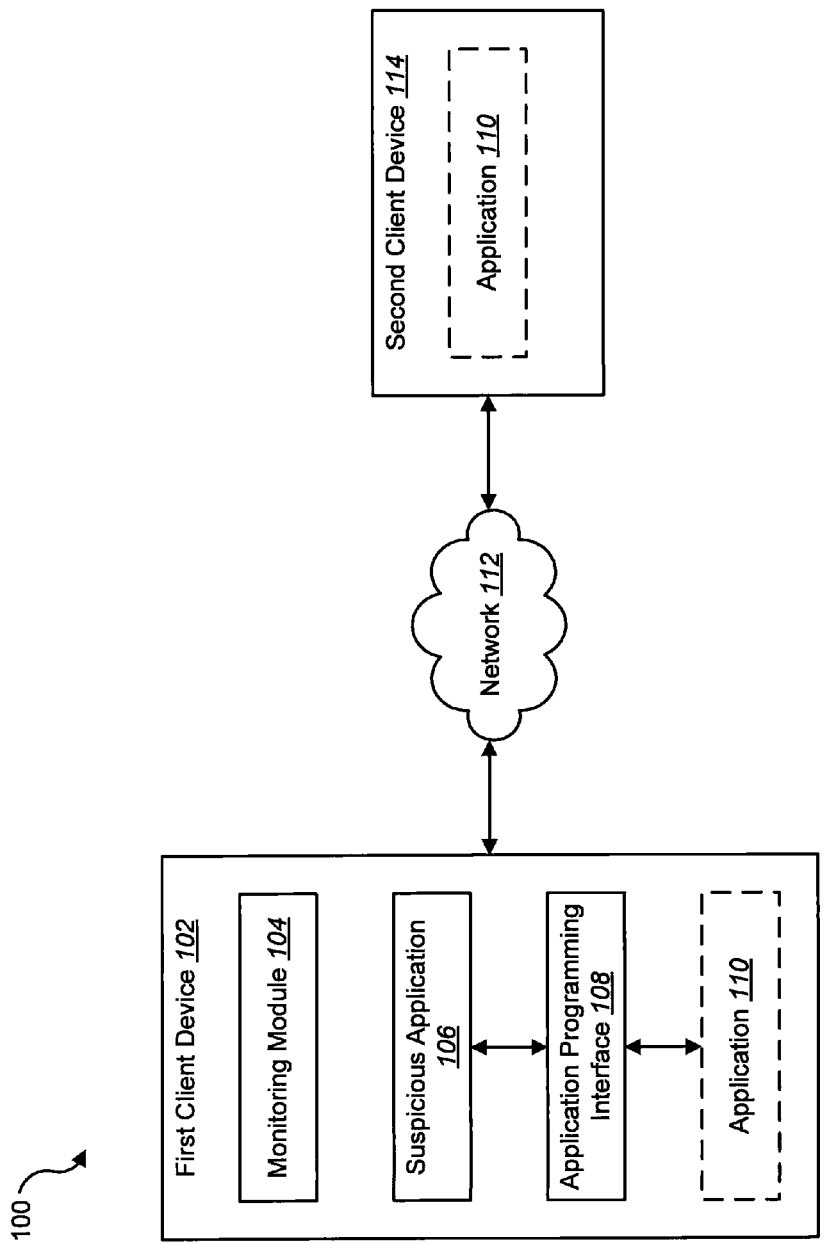
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

An application programming interface (API) is a particular set of rules and specifications that software applications can follow to communicate with each other. An API may serve as an interface between different software applications and facilitates their interaction, similar to the way the user interface facilitates interaction between humans and computers.

In one embodiment, a malicious software application may acquire sensitive data regarding a user from another application by calling a particular API. For example, the malicious application may attempt to interface with an address book application to gather data regarding various contacts of the user. The malicious application may not be able to interface directly with the address book application. As a result, the malicious application may call a particular API to serve as the interface between the malicious application and the address book application. The malicious application may then harvest the data relating to the contacts stored in the address book application. The malicious application may transmit (or otherwise make available) the harvested data to a third party by calling certain APIs.

In one configuration, the malicious (or otherwise suspicious application) may be installed on a smartphone or other type of computing device. The present systems and methods may define how confidential data are brought into an application executing on a smartphone. The present systems and methods may perform static analysis of the application's behavior regarding the handling of the confidential data.

As mentioned previously, by calling certain APIs, a smartphone application may obtain confidential data of a user by calling certain APIs. The application may then expose this confidential data to unauthorized third parties by calling specific APIs. The present systems and methods may provide a data flow analysis of the application that may serve to discover potentially leaky execution paths inside the smartphone application. The basis for the data flow analysis may include defining the APIs that are authorized to bring confidential data into an application and defining the APIs that are authorized to transmit confidential data out of the application.

FIG. 1 is a block diagram illustrating one embodiment of an environment 100 in which the present systems and methods may be implemented. In one configuration, a first client device 102 may include a monitoring module 104. The first client device 102 may be a standalone computer, such as a personal computer (PC), a laptop, a tablet, a smartphone, a personal digital assistant (PDA), a wireless device that may be used to access data through a network 112, or any other type of computing device. The first client device 102 may communicate with a second client device 114 across the network 112.

In one example, a suspicious application 106 may interface with an application 110 via an API 108. The suspicious application 106 may request and receive data from the application 110 through the API 108. The suspicious application 106 may transmit or output the received confidential data to a different application so that the confidential data is accessible by a third party. The suspicious application 106 may output the confidential data to the different application via the API 108 or via a different API used to transmit or output data.

In one configuration, the application 110 that provides the confidential data to the suspicious application 106 via the API 108 may be executing on the first client 102. In one embodiment, the application 110 that provides the data to the suspicious application 106 via the API 108 may be executing on the second client device 114. In other words, communications may be established between the first client device 102 and the second client device 114 across the network 112. The suspicious application 106 may interface with the API 108 to request data from the application 110. The application 110 may provide the data to the suspicious application 106 via the API 108.

In one embodiment, the monitoring module 104 may define security attributes associated parameters of the API 108. The monitoring module 104 may monitor the data returned by these parameters of the API 108. The monitoring module 104 may also perform a data flow analysis to determine how the suspicious application 106 handles the data received by these parameters of the API 108. Details regarding the monitoring module 104 will be discussed below.

Figure 2:
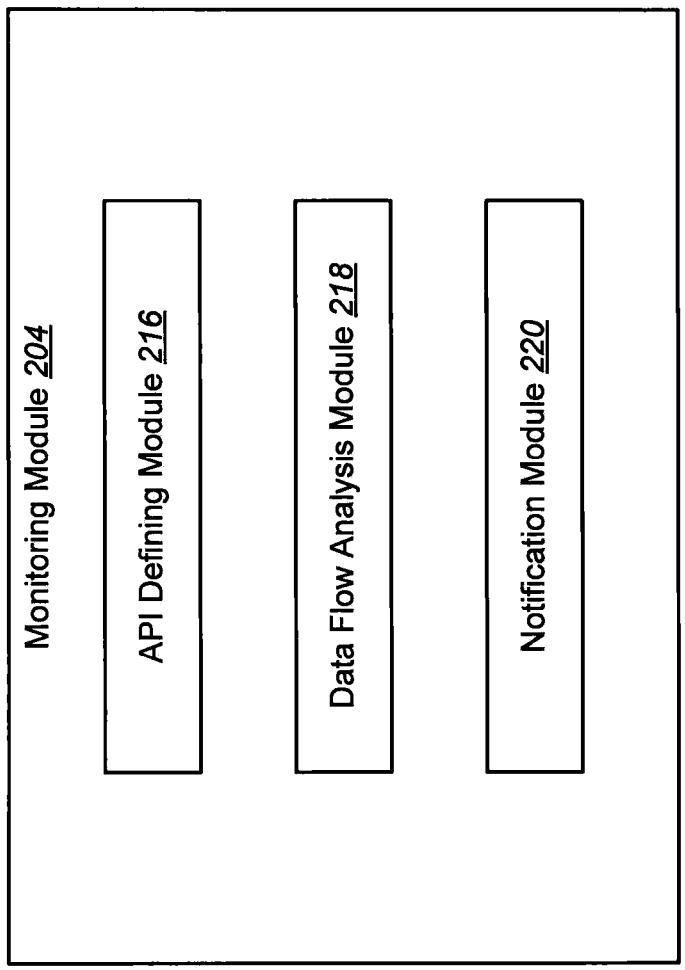
FIG. 2 is a block diagram illustrating one embodiment of a monitoring module in accordance with the present systems and methods.

FIG. 2 is a block diagram illustrating one embodiment of a monitoring module 204 in accordance with the present systems and methods. In one configuration, the monitoring module 204 may include an API defining module 216, a data flow analysis module 218, and a notification module 220. In one example, the API defining module 216 may define one or more security attributes for the parameters and return values of the API 108. For example, the API defining module 216 may define the following security attributes for the API 108: 1) CONFIDENTIAL_DATA_PAYLOAD, 2) CONFIDENTIAL_DATA_PORT, 3) DATA_EXPOSURE_PAYLOAD, and 4) DATA_EXPOSURE_PORT.

In one configuration, the data passed back to the suspicious application 106 via the security attribute CONFIDENTIAL_DATA_PAYLOAD may be data that have been identified as confidential or sensitive data. In one example, the argument passed on the security attribute CONFIDENTIAL_DATA_PORT may cause other data objects to become confidential data. Further, the argument passed on the security attribute DATA_EXPOSURE_PAYLOAD may represent data being outputted from the suspicious application 106. In addition, the argument passed on the security attribute DATA_EXPOSURE_PORT may cause other data objects to be exposed by the suspicious application 106.

The data flow analysis module 218 may identify incoming data passed to the suspicious application 106 on certain security attributes. For example, confidential data that are passed to the suspicious application 106 on the security attribute CONFIDENTIAL_DATA_PAYLOAD may be flagged by the monitoring module 204 for further analysis. The data flow analysis module 218 may also identify outgoing data from the suspicious application 106 on certain security attributes. For example, the data flow analysis module 218 may monitor the suspicious application 106 to verify whether the suspicious application 106 outputs the flagged confidential data via the DATA_EXPOSURE_PAYLOAD of the API 108. If the data flow analysis module 218 determines that the suspicious application 106 outputs the flagged confidential data via a certain security attribute of the API 108, the notification module 220 may generate a notification to a user of the first client device 102. The notification may indicate that the suspicious application 106 may be attempting to harvest and expose confidential data to an unauthorized third party.

In one configuration, when the data flow analysis module 218 identifies confidential data as being passed to the suspicious application 106 via the API 108, the data flow analysis module 218 may conduct the remaining portions of the analysis in a simulated environment. As a result, the data flow analysis module 218 may be able to observe the behavior of the suspicious application 106 with confidential data in a secure, simulated environment without the risk of the suspicious application 106 actually transmitting confidential data to an unauthorized third party.

Figure 3:
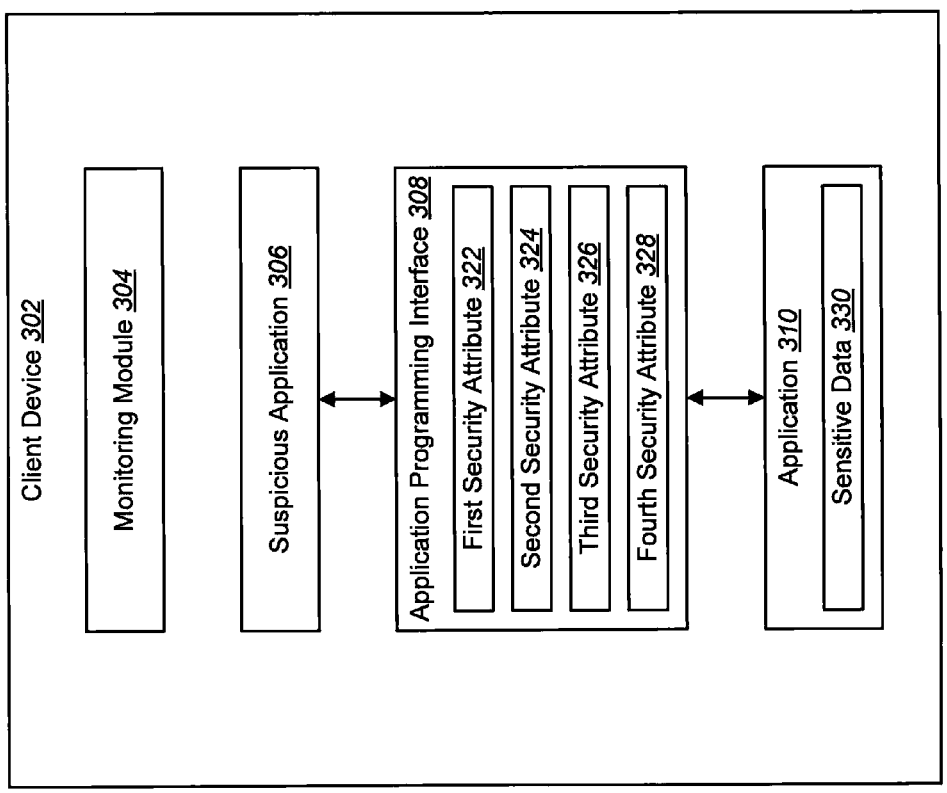
FIG. 3 is a block diagram illustrating one embodiment of a client device in accordance with the present systems and methods.

FIG. 3 is a block diagram illustrating one embodiment of a client device 302 in accordance with the present systems and methods. In one configuration, the device 302 may be a smartphone. The device 302 may include a monitoring module 304, a suspicious application 306, an API 308, and an application 310 that includes sensitive (or confidential) data 330.

As previously explained, the monitoring module 304 may define various security attributes for the API 308. For example, the API 308 may include a first security attribute 322, a second security attribute 324, a third security attribute 326, and a fourth security attribute 328. While only four security attributes are illustrated, it is to be understood that the monitoring module 304 may define more or less security attributes for the API 308.

In one example, the monitoring module 304 may monitor the data the API passes to and from the suspicious application 306 via the defined security attributes. For example, the first security attribute 322 may pass the sensitive data 330 from the application 310 to the suspicious application 306. The monitoring module 304 may mark or otherwise flag the data that are provided via the first security attribute 322. The monitoring module 304 may also monitor data that is outputted from the suspicious application 306 via a certain security attribute of the API 308. For example, the monitoring module 304 may monitor data that are outputted via the second security attribute 324. If the second security attribute 324 outputs the marked or flagged sensitive data 330, the monitoring module 304 may generate a notification to a user of the client device 302. The notification may notify the user that the suspicious application 306 may be a malicious application attempting to distribute the sensitive data 330 to unauthorized third parties. In one configuration, the monitoring module 304 may monitor the data flow of the sensitive data 330 by the suspicious application 306 in a simulated environment.

Figure 4:
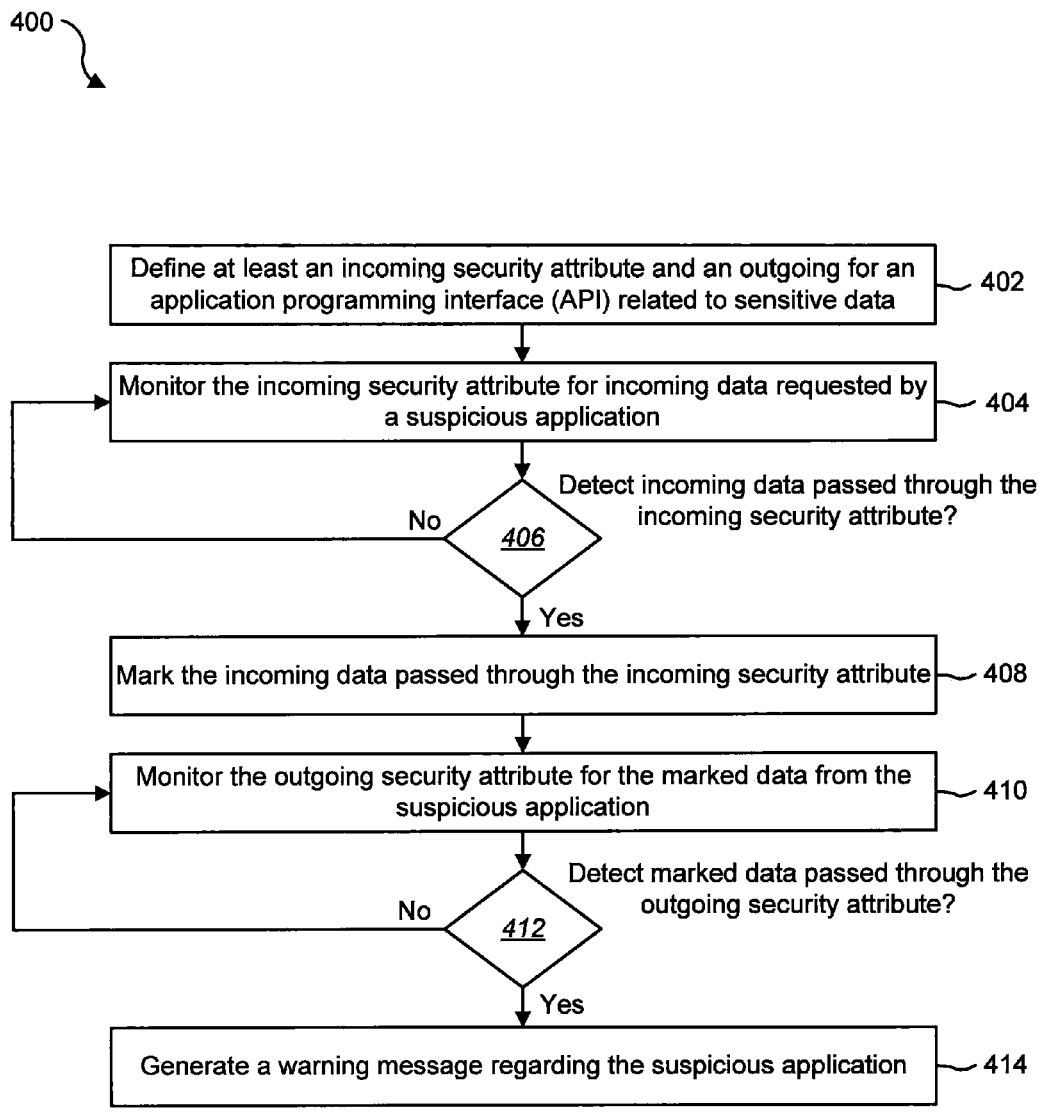
FIG. 4 is a flow chart illustrating one embodiment of a method to identify spreading of sensitive data from a suspicious application.

FIG. 4 is a flow chart illustrating one embodiment of a method 400 to identify spreading of sensitive data from a suspicious application. In one configuration, the method 400 may be implemented by the monitoring module 104.

In one embodiment, at least one incoming security attribute for incoming data and at least one outgoing security attribute for outgoing data may be defined 402 for an API. The incoming security attribute may be monitored 404 for incoming data requested by a suspicious application 106. A determination 406 may be made as to whether incoming data passed through the incoming security attribute of the API 108 has been detected. If it is determined 406 that incoming data have not been detected through the incoming security attribute of the API 108, the method 400 may return to monitor the incoming security attribute. If, however, it is determined 406 that incoming data passed through the incoming security attribute have been detected, the incoming data may be marked 408.

In one configuration, the outgoing security attribute may be monitored 410 for outgoing data from the suspicious application 106. A determination 412 may be made as to whether the marked data have been detected being passed through the outgoing security attribute of the API 108 from the suspicious application 106. If it is determined 412 that the marked data have not been detected, the method 400 may return to monitor the outgoing security attribute. If, however, it is determined 412 that the marked data have been detected being passed through the outgoing security attribute of the API 108 from the suspicious application 106, a warning message regarding the suspicious application may be generated 414. In one configuration, the method 400 may be executed in a simulated environment.

Figure 5:
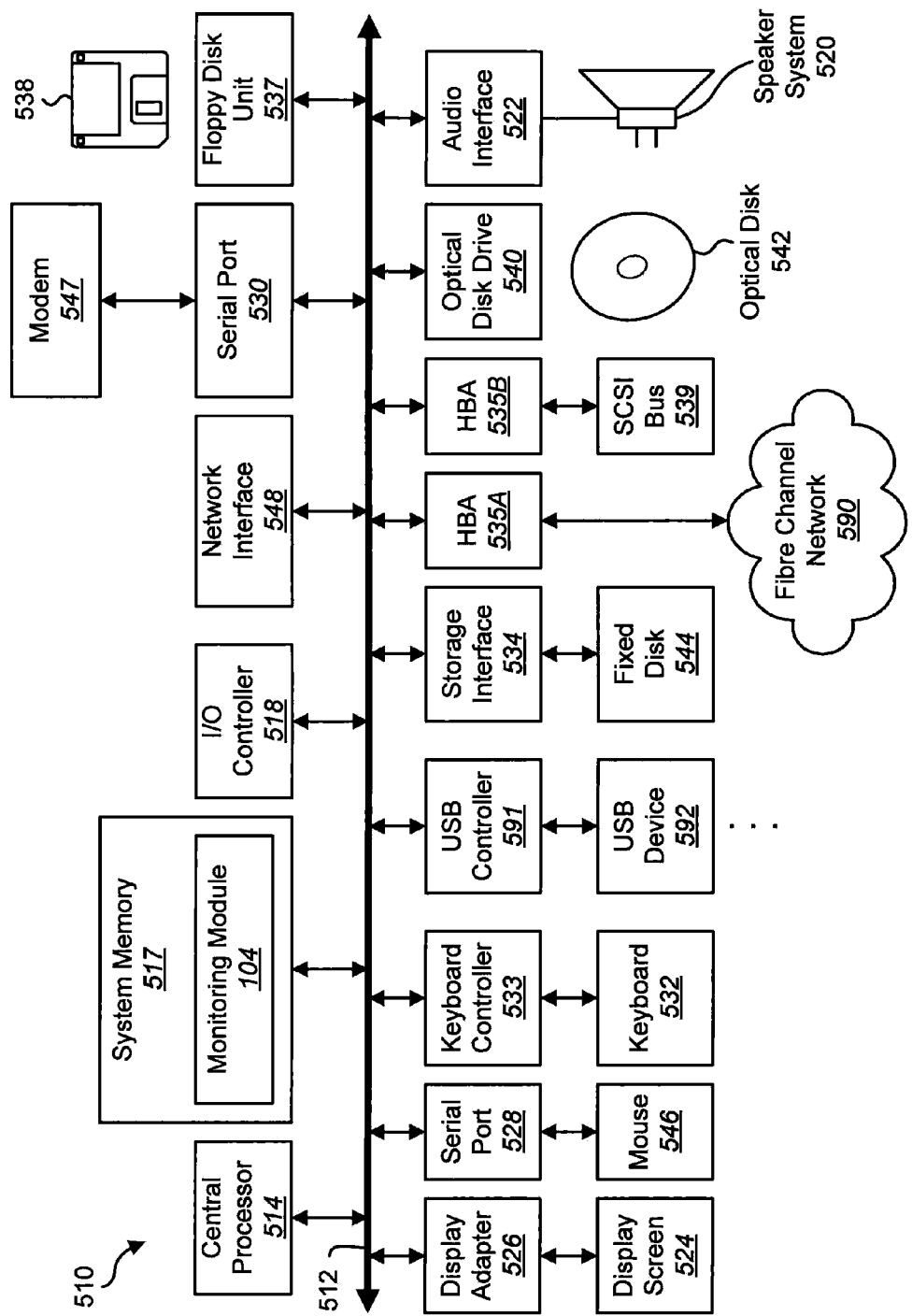
FIG. 5 depicts a block diagram of a computer system suitable for implementing the present systems and methods.

FIG. 5 depicts a block diagram of a computer system 510 suitable for implementing the present systems and methods. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), multiple USB devices 592 (interfaced with a USB controller 591), a storage interface 534, a floppy disk unit 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring module 104 to implement the present systems and methods may be stored within the system memory 517. Applications resident with computer system 510 are generally stored on and accessed via a non-transitory computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present systems and methods. The devices and subsystems can be interconnected in different ways from that shown in FIG. 5. The operation of a computer system such as that shown in FIG. 5 is readily known in the art and is not discussed in detail in this application. Code to implement the present disclosure can be stored in a non-transitory computer-readable medium such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
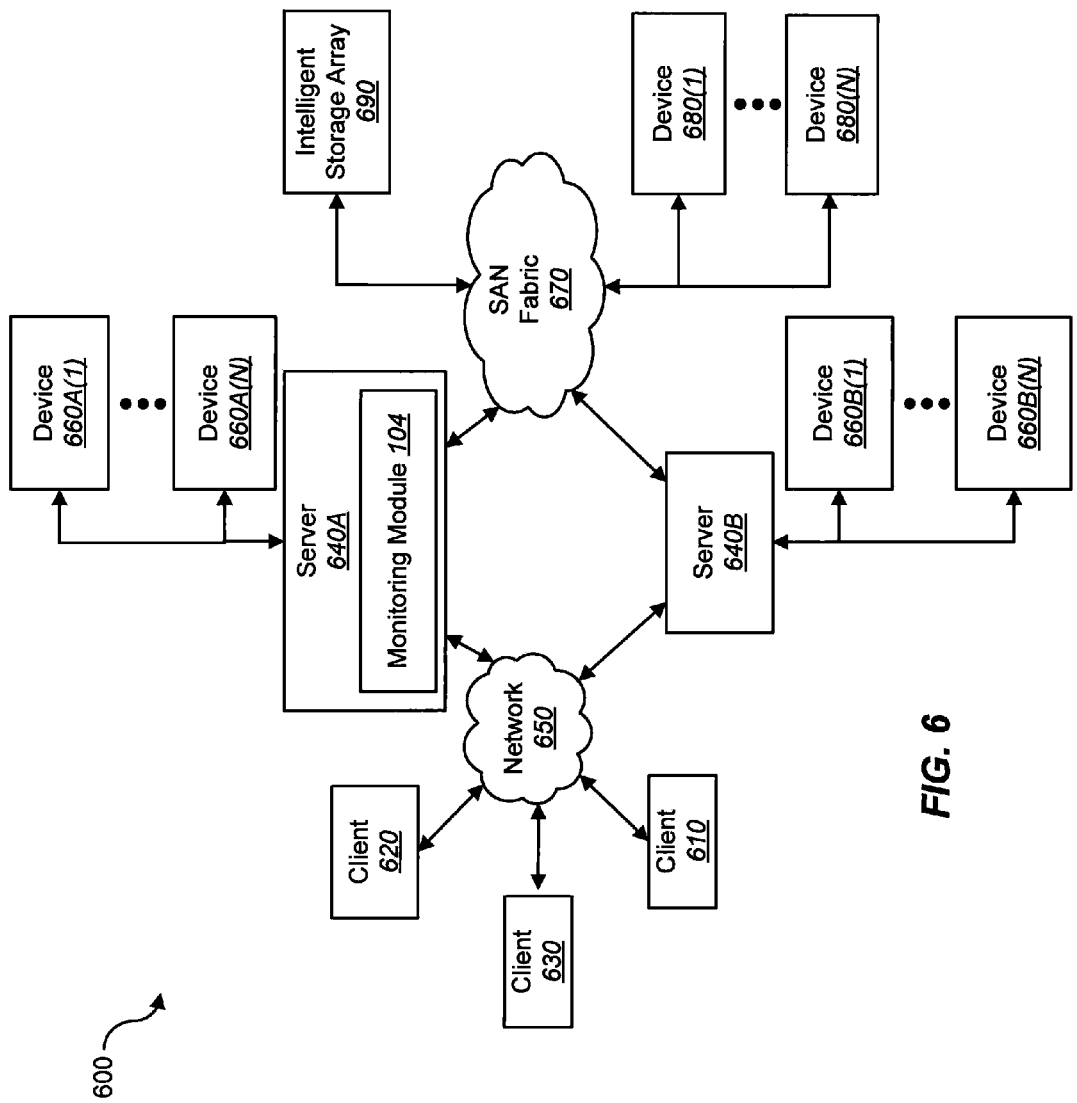
FIG. 6 is a block diagram depicting a network architecture in which client systems, as well as storage servers (any of which can be implemented using computer system), are coupled to a network.

FIG. 6 is a block diagram depicting a network architecture 600 in which client systems 610, 620 and 630, as well as storage servers 640A, 640B (any of which can be implemented using computer system 610), are coupled to a network 650. In one embodiment, the monitoring module 104 may be located within the storage servers 640A, 640B to implement the present systems and methods. The storage server 640A is further depicted as having storage devices 660A(1)-(N) directly attached, and storage server 640B is depicted with storage devices 660B(1)-(N) directly attached. SAN fabric 670 supports access to storage devices 680(1)-(N) by storage servers 640A, 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620, and 630 to network 650. Client systems 610, 620, and 630 are able to access information on storage server 640A or 640B using, for example, a web browser or other client software (not shown). Such a client allows client systems 610, 620, and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to identify spreading of sensitive data from a suspicious application, comprising:

defining, by a processor, a first security attribute for a return value of a first application programming interface (API) and a second security attribute for a parameter of a second API, wherein the first API is different than the second API;

marking, by the processor, data passed through the first security attribute to the suspicious application as sensitive data;

detecting, by the processor, the marked sensitive data being passed through the second security attribute from the suspicious application; and generating, by the processor, a notification regarding spreading of the sensitive data by the suspicious application.

2. The method of claim 1, wherein the first security attribute comprises an incoming security attribute for incoming data passed through the first API to the suspicious application.

3. The method of claim 1, wherein the second security attribute comprises an outgoing security attribute for outgoing data passed from the suspicious application through the second API.

4. The method of claim 1, wherein the suspicious application executes on a smartphone device.

5. The method of claim 1, further comprising monitoring the sensitive data passed to and from the suspicious application through the first API and the second API in a simulated environment.

6. The method of claim 1, further comprising defining at least one additional security attribute for the second API.

7. The method of claim 6, wherein an argument passed on the at least one additional security attribute causes at least one data object to become sensitive data.

8. The method of claim 6, wherein an argument passed on the at least one additional security attribute causes at least one data object in a smartphone device to become exposed.

9. The method of claim 1, further comprising identifying the spreading of sensitive data from a suspicious application using static analysis.

10. A smartphone device configured to identify spreading of sensitive data from a suspicious application, comprising:
 a processor;
 memory in electronic communication with the processor; and
 instructions stored in the memory, the instructions executable by the processor to
  define a first security attribute for a return value of a first application programming interface (API) and a second security attribute for a parameter of a second API, wherein the first API is different than the second API;
  mark data passed through the first security attribute to the suspicious application as sensitive data;
  detect the marked sensitive data being passed through the second security attribute from the suspicious application; and
  generate a notification regarding spreading of the sensitive data by the suspicious application.

11. The smartphone device of claim 10, wherein the first security attribute comprises an incoming security attribute for incoming data passed through the first API to the suspicious application.

12. The smartphone device of claim 10, wherein the second security attribute comprises an outgoing security attribute for outgoing data passed from the suspicious application through the second API.

13. The smartphone device of claim 10, wherein the suspicious application executes on the smartphone device.

14. The smartphone device of claim 10, wherein the instructions are further executable by the processor to monitor the sensitive data passed to and from the suspicious application through the first API and the second API in a simulated environment.

15. The smartphone device of claim 10, wherein the instructions are further executable by the processor to define at least one additional security attribute for the second API.

16. The smartphone device of claim 15, wherein an argument passed on the at least one additional security attribute causes at least one data object to become sensitive data.

17. The smartphone device of claim 15, wherein an argument passed on the at least one additional security attribute causes at least one data object in the smartphone device to become exposed.

18. The smartphone device of claim 10, wherein the monitoring module is further configured to identify the spreading of sensitive data from a suspicious application using static analysis.

19. A computer-program product for identifying spreading of sensitive data from a suspicious application, the computer-program product comprising a non-transitory computer-readable medium having instructions thereon, the instructions being executable by a processor to:
 define a first security attribute for a return value of a first application programming interface (API) and a second security attribute for a parameter of a second API, wherein the first API is different than the second API;
 mark data passed through the first security attribute to the suspicious application as sensitive data;
 detect the marked sensitive data being passed through the second security attribute from the suspicious application; and
 generate a notification regarding spreading of the sensitive data by the suspicious application.

20. The computer-program product of claim 19, wherein the first security attribute comprises an incoming security attribute for incoming data passed through the first API to the suspicious application.

* * * * *